Aug. 13, 1957    C. M. SCHMITT    2,802,275
WELDING ELBOW SALVAGER
Filed Sept. 20, 1955    2 Sheets-Sheet 2
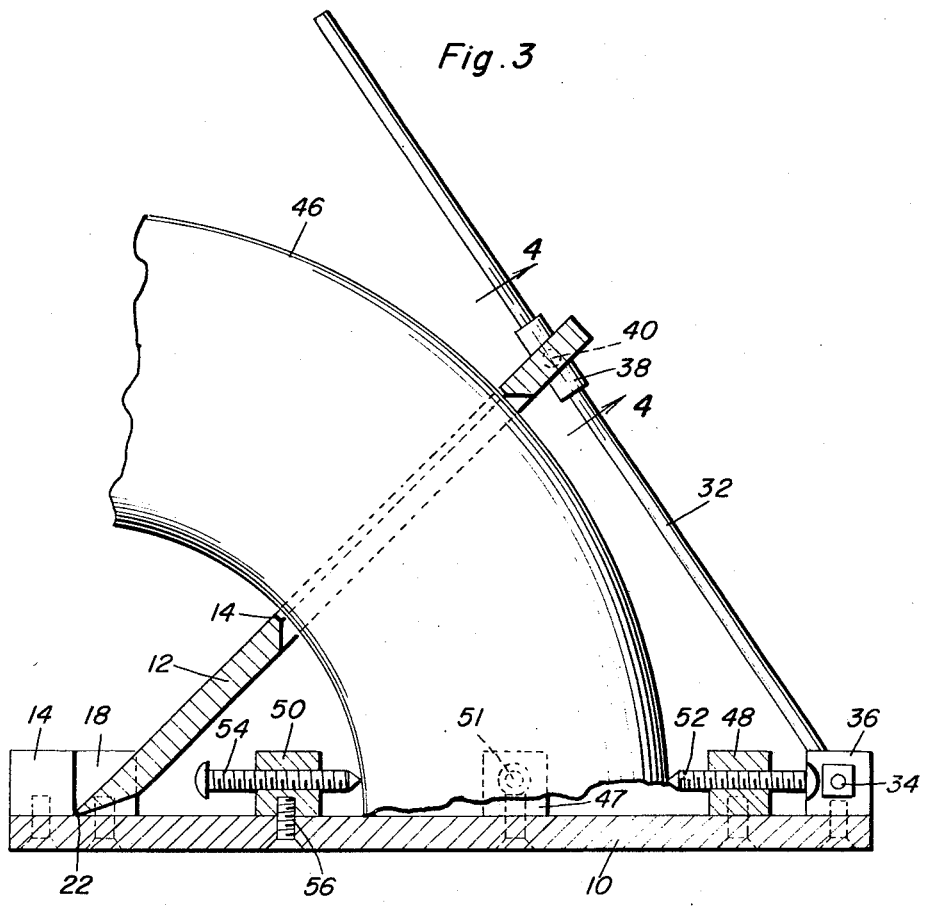
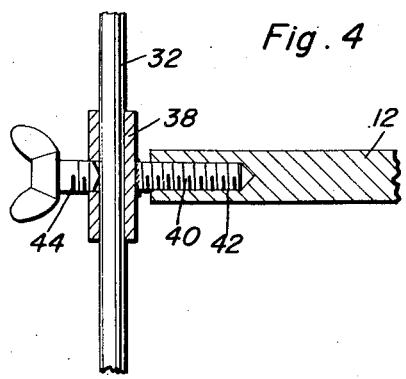
Claire M. Schmitt
INVENTOR.
BY *Clarence A. O'Brien*
*and Harvey B. Jackson*
Attorneys

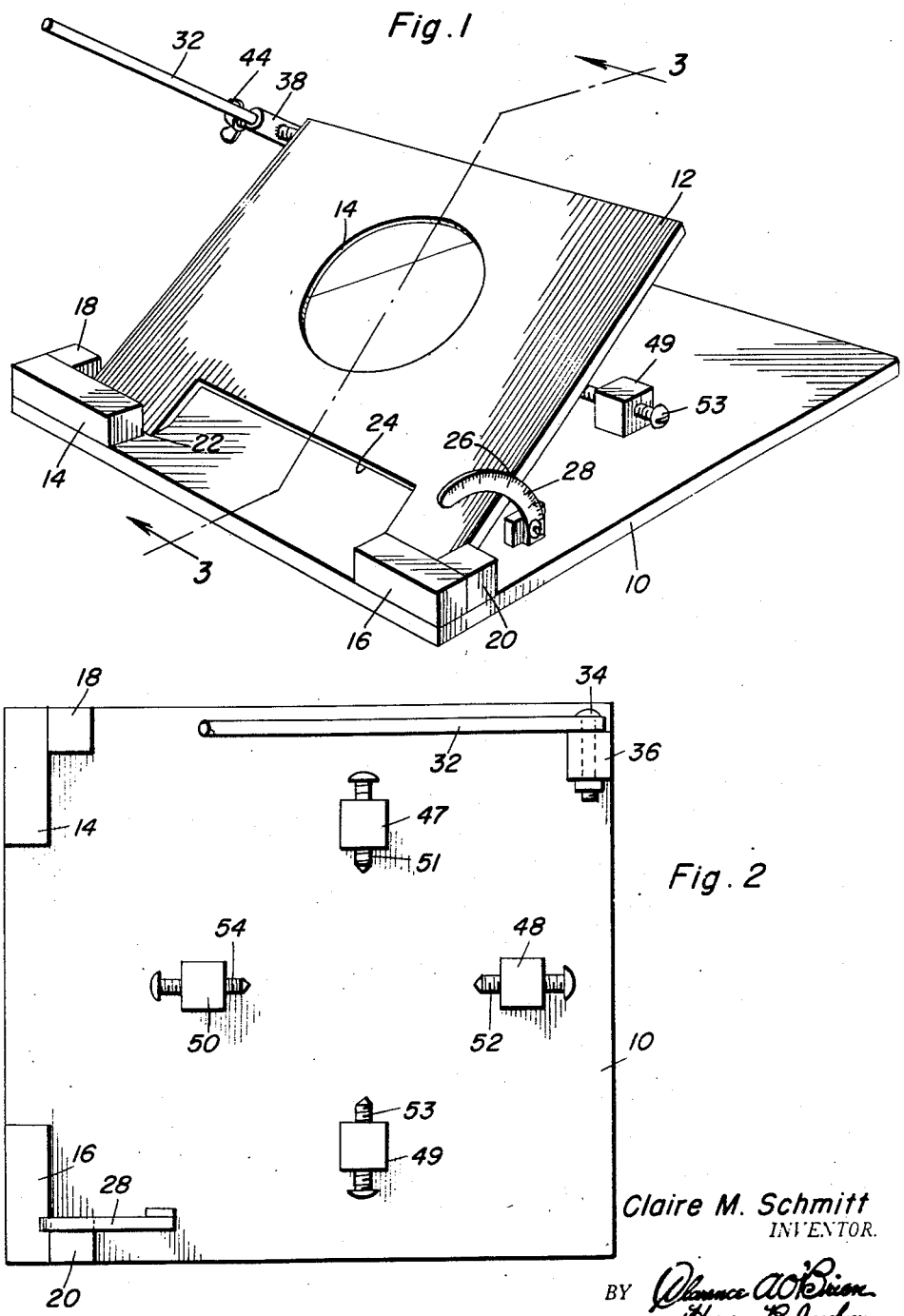

2,802,275
WELDING ELBOW SALVAGER

Claire M. Schmitt, McPherson, Kans.

Application September 20, 1955, Serial No. 535,355

6 Claims. (Cl. 33—174)

This invention relates to geometrical instruments and particularly to a device which enables salvaging of used welding elbows to be practical.

An object of this invention is to provide a geometrical instrument for use in marking elbows for subsequent cutting, the device being primarily useful with used elbows in order that they may be salvaged for further use.

Industry has adapted standard radii for each elbow corresponding to the nominal pipe diameter which is as follows: The standard radius of a welding elbow is one and one-half times the nominal pipe diameter, and the standard radius of a short radius welding elbow is the nominal pipe diameter. Accordingly, another object of the invention is to provide a welding elbow marking device which has an apertured template which is pivoted about a pivot axis, the distance between that axis and center of the aperture being equal to the radius of the elbow for which the marking device is adapted. The marking device is made for all sizes of welding elbows.

Another object of this invention is to provide a geometrical instrument as above, the instrument featuring means for holding the elbow during the measuring and marking operation, the means engaging the elbow at places spaced from the ends thereof so that the ends may be ragged and yet not affect the holding ability of the device.

A more specific object of the invention is to provide a welding elbow salvaging device wherein the welding elbow is held in such position that a template is movable on the same radius as the fixed radius of the elbow in order that it may be marked by scriber, chalk or by any suitable marking instrument or device.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the device;

Figure 2 is a plan view of the device with the template removed in order to show the structure thereunder;

Figure 3 is a sectional view taken on the plane of line 3—3 of Figure 1 and in the direction of the arrows, and Figure 4 is an enlarged fragmentary sectional view taken on the line 4—4 of Figure 3 and in the direction of the arrows.

In the accompanying drawings there is illustrated the preferred embodiment of the invention. Although the geometrical instrument described herein is primarily useful in salvaging used welding elbows, it is also useful in connection with new stock. However, the structural make-up of the preferred embodiment is such that salvaging of elbows is possible on a scale which makes it profitable. If too much time is required to salvage an elbow, it of course would not be profitable to salvage the same in the absence of a critical shortage of materials. Accordingly, with this in view, the structural simplification and facility of actuation inherent in this device is one of the aims of the invention.

There is a base 10, preferably of flat metal sheet stock on the upper surface of which the remainder of the structure is located. The other structure consists of a template 12 on which a scriber or other marker is adapted to rest when moving it around a pipe elbow which projects through the aperture 14 in template 12. Means are provided on the template and the base plate for mounting the template for swinging movement. Preferably, the means consist of a pair of guide blocks 14 and 16 secured to the surface of base plate 10 near one edge thereof. Template positioning blocks 18 and 20 are secured to the top surface of base plate 10 adjacent to the guide blocks 14 and 16 and at the opposite edges of the template 12. All of these blocks are secured to the base plate 12 by screws and they pass through slots in the base plate 10 so that they may be adjusted and then secured tightly in place. However, this is not an essential in that one or more of the blocks may be formed integral with plate 10 or may be otherwise fastened thereto.

One edge of template 12 has knife edges 22 on opposite sides of a cut-out 24, the knife edges bearing against guide blocks 14 and 16 at the corner formed by the inner vertical edge thereof and the horizontal upper surface of the base plate 10. This construction allows the template 12 to be pivotally actuated about the knife edges 22 as a center of rotation. An outwardly opening notch 26 is formed in one side of the template 12 in order to accommodate protractor 28 that is secured to the base 10. The protractor is used to measure and in setting the angle of the template 12 with respect to the plane of base plate 10.

An adjusting rod 32 has an opening at one end through which a pivot 34 is passed. This pivot is mounted in a bearing 36 carried by the base plate 10 preferably at one corner thereof (Figure 2). Adjusting rod 32 is passed through a sleeve 38, the latter having a stud 40 extending laterally therefrom which is mounted threadedly in bore 42 in the edge of template 12. Stud 40 is loose enough in the bore 42 so that it may rotate rather freely. Setscrew 44 is threaded in the sleeve 38 and has its inner end in contact with the adjusting rod 32. When the template 12 is rotated to the desired position, the sleeve 38 rotates with respect to template 12 by having stud 40 turn in its bore 42. At the same time the adjusting rod 32 is free to slide in sleeve 38. When the desired angularity of the template 12 is obtained, the winged setscrew is tightened thereby maintaining that angular relationship which is necessary for marking the elbow 46.

The means for holding elbow 46 supported in proper position for being marked are such as to be independent of the surface contour of the ends of the elbow 46. In this way, used elbows or other fittings are held and marked. Preferably these means consist of four centering blocks arranged in quadrature, blocks 47, 48, 49 and 50 having threaded passageways extending completely therethrough in order to accommodate the setscrews 51, 52, 53 and 54. These setscrews are substantially coplanar and are in a plane parallel to but spaced from the plane of the base 10. As shown in Figure 3, blocks 47, 48, 49 and 50 are secured to base plate 10 by screws 56. Other expedients may be resorted to in this connection.

In use, elbow 46 is held by the screws 51, 52, 53 and 54 with its radius of curvature the same as the radial distance measured from an axis passed through edges 22 perpendicularly to the center of opening 14. Then the template 12 is moved to the desired position and a scriber, marker or the like is used with template 12 as a guide to place a marking on the outer surface of elbow 46. The elbow 46 is now ready to be removed and cut by standard means and methods.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A marking device for salvaging used elbows that are curved in a circular arc and that are circular in cross section, said marking device comprising a base, a template having a circular aperture in it through which the elbow is adapted to pass, means including a knife edge mounting said template on said base for pivotal movement and forming the center of the circular arc, said template between said circular aperture and said knife edge being coincident with a radius of the circular arc, and means carried by said base engageable with a part of the elbow spaced from both of the ends thereof for supporting the elbow in position on the base.

2. The marking device of claim 1 wherein said elbow supporting means include at least one adjustable member elevated above the surface of said base.

3. In a device for marking an elbow that is circular in cross-section and that is longitudinally curved on a circular arc, a template, said template having knife edges along one edge, means forming an abutment for said knife edges to define a pivot axis for the template, a base to which the last mentioned means are secured, means to grip the elbow carried by said base and to support the elbow spaced from the upper surface of the base, locking means connected with said template for holding said template in a selected angular position and including a sleeve pivotally connected to said template, an adjusting rod slidably disposed in said sleeve and having one end pivotally connected to said base, a locking device carried by said sleeve and engageable with said adjusting rod for locking said template in a selected angular position, said template having a circular opening through which the elbow is passed and remains during the pivotal movement of the template, said pivot axis also falling on the center of the circle of which said circular arc is a part whereby said template is always on a radius thereof, and said circular opening being movable along a path which coincides with the longitudinal curvature of the elbow.

4. In a marking device for pipe elbows, a base plate having an upper surface, a template having a knife edge contacting said upper surface, a guide block secured to said base plate upper surface and forming an abutment for said knife edge so that the pivot axis of said template is in the plane of said base plate, and means secured to said base plate and located above said plane for gripping the elbow and holding the same fixed for marking along said template.

5. The combination of claim 4 wherein the last mentioned means includes a plurality of setscrews arranged on intersecting axes in order to center the elbow.

6. The marking device of claim 4 wherein said template has an aperture through which the elbow is adapted to pass while it is being held for marking, the distance between the pivot axis of said template and the center of said aperture being the same as the radius of the elbow being marked.

References Cited in the file of this patent

UNITED STATES PATENTS

| 279,336 | Clark | June 12, 1883 |
| 1,262,830 | Nicolson | Apr. 16, 1918 |
| 1,661,274 | Steere | Mar. 6, 1928 |
| 2,389,463 | Smotzer | Nov. 20, 1945 |
| 2,464,444 | Gantz | Mar. 15, 1949 |
| 2,607,126 | Sekki | Aug. 19, 1952 |

FOREIGN PATENTS

| 24,339 | Great Britain | 1908 |